(12) United States Patent
Eldar

(10) Patent No.: US 9,369,608 B2
(45) Date of Patent: Jun. 14, 2016

(54) PRINTING METHODS AND APPARATUS

(75) Inventor: Dror Eldar, Raanana (IL)

(73) Assignee: Hewlett-Packard Industrial Printing LTD, Netanya, IL (US)

( * ) Notice: Subject to any disclaimer, the term of this patent is extended or adjusted under 35 U.S.C. 154(b) by 1043 days.

(21) Appl. No.: 12/966,627

(22) Filed: Dec. 13, 2010

(65) Prior Publication Data

US 2012/0147428 A1  Jun. 14, 2012

(51) Int. Cl.
*H04N 1/405* (2006.01)
*G06F 3/12* (2006.01)
*G06K 15/00* (2006.01)

(52) U.S. Cl.
CPC ............ *H04N 1/4051* (2013.01); *G06F 3/1208* (2013.01); *G06F 3/1232* (2013.01); *G06F 3/1247* (2013.01)

(58) Field of Classification Search
USPC ........................ 358/3.2, 1.13, 3.07, 3.06, 3.13
See application file for complete search history.

(56) References Cited

U.S. PATENT DOCUMENTS

| 5,745,658 | A  | * | 4/1998  | Gerety ........................... 358/1.2 |
| 6,505,905 | B1 |   | 1/2003  | Krouss |
| 6,631,964 | B2 |   | 10/2003 | Askeland et al. |
| 6,938,970 | B2 |   | 9/2005  | Van den Bergen |
| 7,400,335 | B2 |   | 7/2008  | Sanger |
| 7,497,538 | B2 |   | 3/2009  | Heydinger |
| 2006/0109513 | A1 | * | 5/2006 | Lee ............................. 358/3.06 |
| 2006/0132867 | A1 | * | 6/2006 | Sugiyama et al. ............ 358/504 |
| 2009/0085952 | A1 | * | 4/2009 | Yamazaki ........................ 347/19 |
| 2009/0213433 | A1 |   | 8/2009 | Nakahara |
| 2010/0238510 | A1 | * | 9/2010 | Yoshizawa ................... 358/3.07 |
| 2010/0245470 | A1 | * | 9/2010 | Murayama et al. ............. 347/37 |

* cited by examiner

*Primary Examiner* — Quang N Vo
(74) *Attorney, Agent, or Firm* — HP Inc Patent Department

(57) ABSTRACT

A method of generating a printable image from a base image includes identifying parameters of a printer on which the printable image is to be printed, and creating a bit map image from a plurality of sub-cells, the identified parameters, and the base image.

13 Claims, 6 Drawing Sheets

PRINTING METHODS AND APPARATUS

BACKGROUND

In translating an image to printed page, the many colors and textures present in a continuous tone image are represented on the printed page by a limited number of inks applied in a specific way so as to approximate the continuous tone image. Various processes by which continuous tone (CT) images are printed to print media include half toning. For example, an image with many colors, as well as dark, light, and mid tones, is represented on print media using, for example, drops of ink on the print media. Color and the representation thereof is created in one way by using frequency modulation (FM) half toning. In FM half toning, or screening, the greater a number of drops of ink in an area of print media, the darker the perceived color. The fewer the number of drops of ink in an area of the print media, the lighter the color.

To create an image to be printed, such as a bit map (BMP) image, the image is created using various patterns of inks of different colors, applied to the print media according to the printing process, such as FM or amplitude modulation (AM) half-toning. Half toning is accomplished in modern printers and systems using digital filters or screens. Screening is typically done with a raster image processor (RIP), which screens a CT image with a screening cell to create the BMP image that is to be printed.

In an ink-jet printer configuration, printing the drops of ink to the print media is done as precisely as possible so as to create a printed image as close to the original CT image as is possible. However, printing is typically accomplished in many passes of a moving print head moving over the media, or of the moving print media under a stationary print head, or the like. In such a printing process, errors such as mechanical registration and translation errors can and do occur. As the sizes of print drops and the pitch, or distance, between dots decreases, such errors become more noticeable.

For the reasons stated above, and for other reasons that will become apparent to those skilled in the art upon reading and understanding the present specification, there is a need in the art for alternative methods and apparatus for printing an image to a print substrate.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, electrical or mechanical changes may be made without departing from the scope of the present disclosure. The following detailed description is, therefore, not to be taken in a limiting sense.

To correct for errors such as mechanical registration and translation errors, printers typically use one or more techniques to correct flaws. Such techniques include defining a position of every print head on the printer, and compensating for mechanical issues by the timing of drop placement; performing mechanical accuracy tuning; printing test patterns to monitor back and forth printing positioning or offset between colors, and compensating using software; checking an actual amount of advance of a print substrate relative to the print heads; and use of multi-pass printing methods such as those described in U.S. Pat. No. 7,513,589, which is commonly owned and assigned, to reduce dependencies between adjacent passes of printing.

Each of the error corrections has issues of its own. For example, mechanical error correction typically uses a large amount of time to make corrections, and the corrections are not stable. That is, once a correction is made, the mechanical issues can be reintroduced simply by continued printing, and regular further correction as well as scheduled maintenance may be necessary. Multi-pass printing reduces some of the mechanical issues since adjacent print passes are from different layers having reduced dependencies, but multi-pass printing also multiplies the amount of data used for printing the image. That is, multiple pass printing uses multiple data sets, each of which uses resources. For example, to have reduced dependency of images, for each portion of image that is to be printed, that portion of the image uses its own data set. Therefore, for each data set, a raster image processing (RIP) step is used, and the size and amount of data transformation used create many issues.

Figure 1:
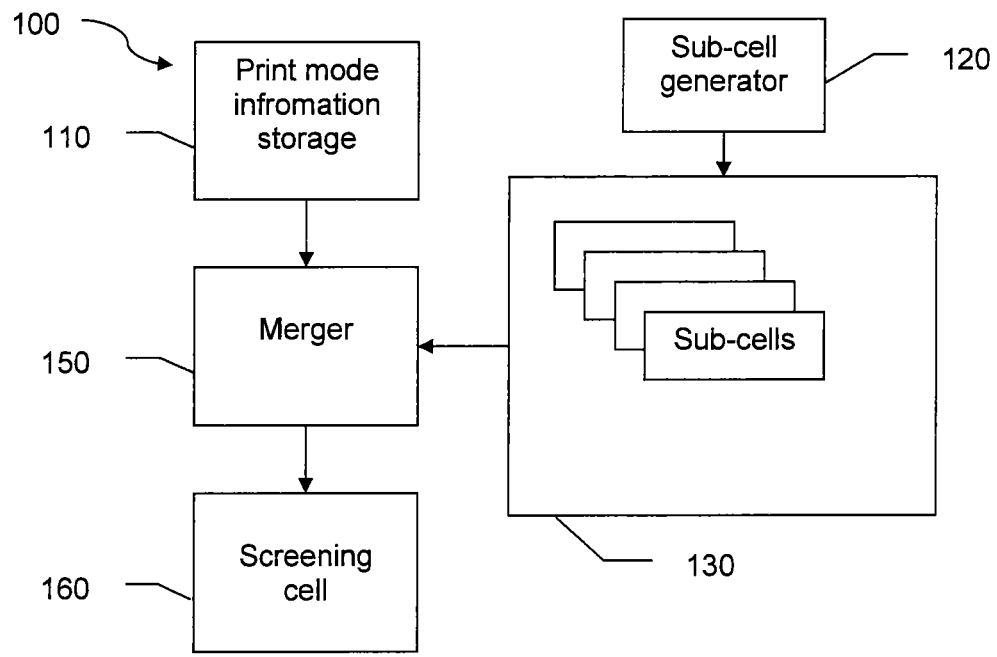
FIG. 1 is a block diagram of a system for producing screening cells according to one example of the present disclosure.

FIG. 1 is a generalized block diagram of a system 100 for producing cells according to one example. Input to this system is from a storage 110, which may be any type of storage, and which stores information to be printed as well as information about a printer and print mode or modes for the printer. This information describes, at least, relevant details of the method in which a given printing process on a printer operates, that is, the physical operation of a print process for the print mode on the printer. Sub-cell generator 120 generates at least one sub-cell into sub-cell storage 130. Each sub-cell is generated according to any known in the art method for the generation of screening cells. Merger 150 combines the generated sub-cells in an interlaced fashion to form an integrated cell 160. Further details of the merger of sub-cells are described herein.

Figure 2:
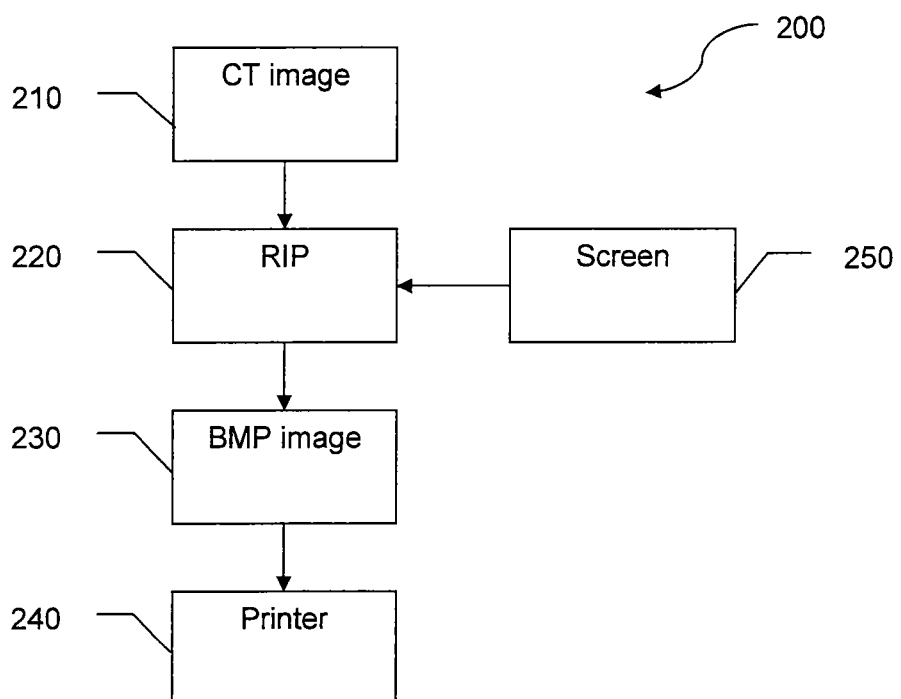
FIG. 2 is a block diagram of a sub-system according to prior art.

FIG. 2 is a block diagram of a sub-system 200 for creating a bit map image to be printed, according to one example of the prior art. Continuous tone (CT) image 210 and bit map (BMP) image 230 are image files in a file storage system (not shown), which can be any type of storage system, and may include either one storage unit for both images, or separate units for each image. Raster image processor (RIP) 220 converts the CT image to a bit map image using a predefined screening cell 250. The resulting bit map image 230 created by screening the CT image 210 with the screening cell 250 is printed by printer 240.

Figure 3:
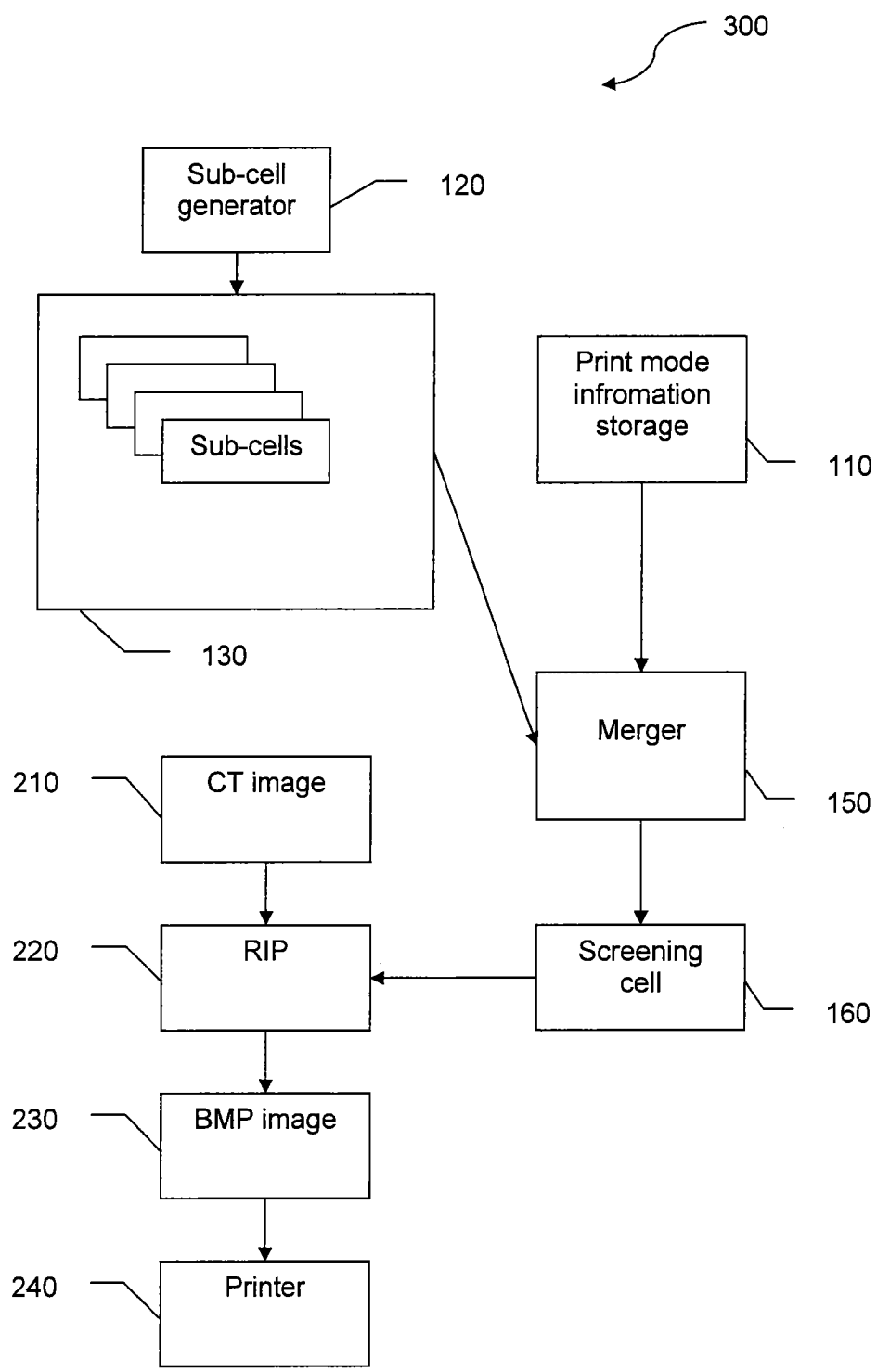
FIG. 3 is a block diagram of a printing system according to another example of the present disclosure.

FIG. 3 is a block diagram of a system 300 according to one example. System 300 uses a sub-cell generator such as sub-cell generator 120, print mode information such as that stored in print mode information storage 110, and a merger such as merger 150 to generate a screening cell 160 that takes into account the print mode information from the print mode information storage 110, as will be further described below. The merger 150 generates a screening cell such as cell 160, which is used along with a CT image, by a RIP such as RIP 220 to produce a bit map image such as bit map image 230.

Figure 4:
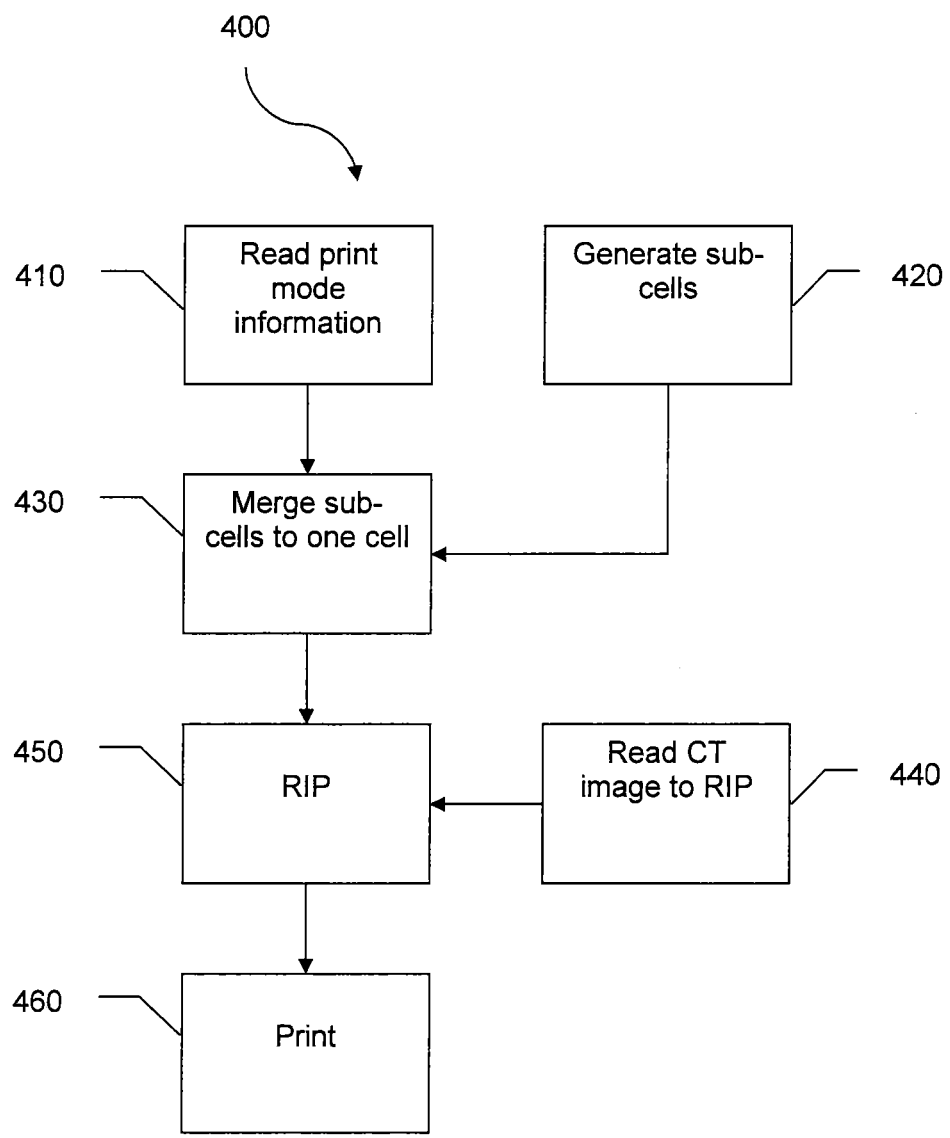
FIG. 4 is a block diagram of a printing process according to another example of the present disclosure.

FIG. 4 is a flow chart diagram of a method 400 according to another example. Method 400 in one example comprises reading print mode information from a printer in block 410, and generating sub-cells in block 420. The sub-cells and print mode information are used to interlace the sub-cells into one single screening cell in block 430. A continuous tone image is read into a RIP in block 440, and the CT image and merged screening cell are processed in the RIP in block 450. The resulting bit map image is sent to a printer in block 460.

Reading print mode information in one example comprises identifying a print mode and printer parameters for a specific printer, on which a bit map image is to be printed, before preparing a screening cell from sub-cells and print mode information. Each printer and each print mode has a specific process by which it prints, and the process can be different for different printers, and for different print modes in the same printer. For example, a printer may print every other line of an image in a different direction, such as left to right followed by right to left. A printer may print in a specific number of columns, line separations, and the like. The examples of the present disclosure use the print specifications from the printer that will be printing the image to create a screening cell to screen a CT image to create a bit map image that the printer can print using its own printing specifics. Also, the examples create the bit map image such that printing it using the printer's own printing specifics results in a print image that has reduced effects of printing an image, including by way of example mis-registration effects, moiré patterns, and the like.

Merging sub-cells and print parameters into a single screening cell in one example comprises using print mode information, including print parameters, retrieved from the printer, the print mode information containing information on exactly how the printer prints for that specific mode. Parameters of print modes could include by way of example only and not by way of limitation the order of print head passes, the advance of print substrate, line spacing, or nearly anything that the printer uses to print an image. Given the sub-cells that have been generated, and knowing exactly how the printer will print a resultant image, the merger takes into account the print information and creates a single integrated screening cell with the sub-cells interlaced to take into account the specific print mode of the printer. This also allows the advantages of multi-layer type printing without using multiple RIPs.

Generated sub-cells (dependent in one example on the image itself that is to be printed) are merged into a single cell that is used for screening. The integrated cell is designed so that when a RIP is performed on the cell, the print process is built into the screening cell with interlaced sub-cells and taking in account the known printing parameters. The cell is created in such a way as to reduce potential problem printing issues such as mis-registration and the like. The way this is done in one example is to create the screening cell around the printing mode that will be used. For example, if the print mode is such that the printer prints every fourth line every pass, then the merger creates a screening cell with four 25 percent screens, that is, four layers each having 25 percent of the data of the final image. The layers are interlaced into one screen cell. The combined screen cell is RIPed with the CT image to be printed, with a single process to create a bit map image to be sent to the printer.

The printer operates to print the bit map image according to its print mode. Because the bit map image resulting from a RIP of the CT image with the single screening cell is designed to print under the print mode parameters obtained from the printer, the printing quality is increased. In the example, the four 25 percent screens are interlaced together. When printing of the bit map image resulting from the RIP of the screen cell and the CT image happens, the first line printed is from the first screen, the second line is the first line of the second screen, the third line is the first line from the third screen, the fourth line is the first line from the fourth screen, the fifth line is the second line from the first screen, and so forth. The printer simply prints in the way its mode tells it to print. However, because the screen is created knowing the way the printer prints, the printing of adjacent lines is actually printing from separate screens. This is all seamless to the printer and the operator. The screen that is RIPed to a bit map image that is then printed is designed and created to use the print parameters of the printer. What is printed on the print substrate is data from four different screens, but instead of having four different RIPs and images to print, there is a single RIP and a single image to print.

For another example, also referring to the method shown in FIG. 4, screen cells are generated and stored in a preparation block 420. Print mode information is read in block 410, and the predefined cells are merged in an interlaced fashion in block 430. The resulting integrated cell is used at the RIP block 450, converting a CT image, to be printed, that is read from storage 440 to a bit map image to be printed by the printer in block 460.

In particular, suppose the print mode information retrieved in block 410 indicates that the mode prints in a manner such that each and every odd row of pixels is printed by one ink-jet print head comprising multiple nozzles, each nozzle printing one and only one row, and each and every even row of pixels is printed in a similar fashion either by a different printing head, or by the same head at a different time. The odd rows are printed in a first pass, and the even rows are printed in a second pass. Inaccurate calibration or tuning of the first pass relative to the second pass in a normally RIPed image can cause undesirable artifacts and degradation of image quality in the printed result.

According to an exemplary embodiment of the present disclosure, that the image is printed in two passes is coded and stored in the print mode information which is used to create a merged single screening cell that integrates two different screen sub-cells as is known in the art, a first cell and a second cell, to form a third integrated cell in which even rows belong to the first screen cell and odd rows belong to the second cell. Then, when the bit map image created by RIPing the image to be printed with the screen cell 160 is printed, it prints as the print mode instructs, but the bit map image has the nature of a multi-layer print process with only the single bit map image.

Sub-cells in the present examples are merged according to the print mode. If the print mode for the printer prints different lines in different passes, the merged single cell uses different lines. If the print mode uses different columns for printing, the merged single cell uses different columns. The print parameters determine the merged cell structure, so that the RIP of the continuous tone image with the single screen cell is tailored specifically to the print mode of the printer, and errors of mis-registration and the like are reduced. This also reduces the number of RIPs previously used to generate an bit map image that prints more realistically on print substrate, saving time and data processing.

With the single screen cell and the resulting bit map image of the various examples described herein, when an event, such as a mis-registration or the like, in the printing of the bit map image that would usually result in errors that are visible in the final image happens, since the print information is built in to the bit map image, the error is reduced. For example, the single screen has built into it the way the printer prints for that specific print mode, so if the printer prints one pass left to right then the second pass right to left, a mis-registration has less effect since the passes are printing lines of two different screens that are not dependent on each other. Therefore, errors in mis-registration and the like are reduced while only using one screen, and therefore only using one RIP process. This saves not only time, but reduces the amount of data to be processed.

Figure 5A:
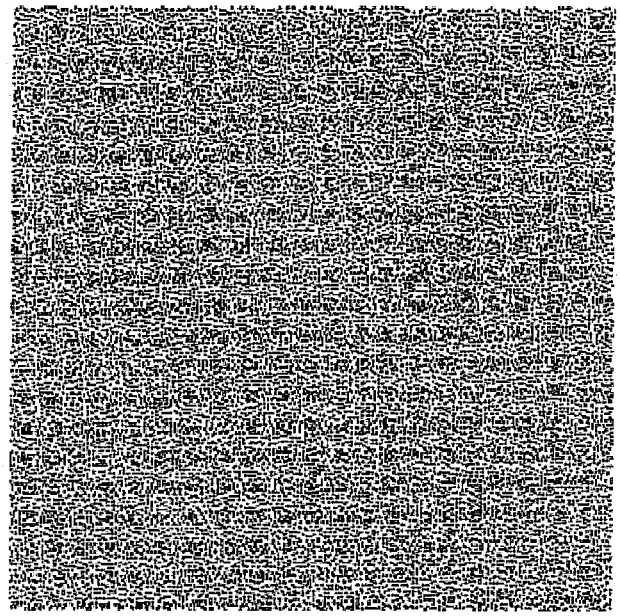
FIGS. 5a and 5b show a representation of a sampled screening cell according to prior art.
Figure 5B:
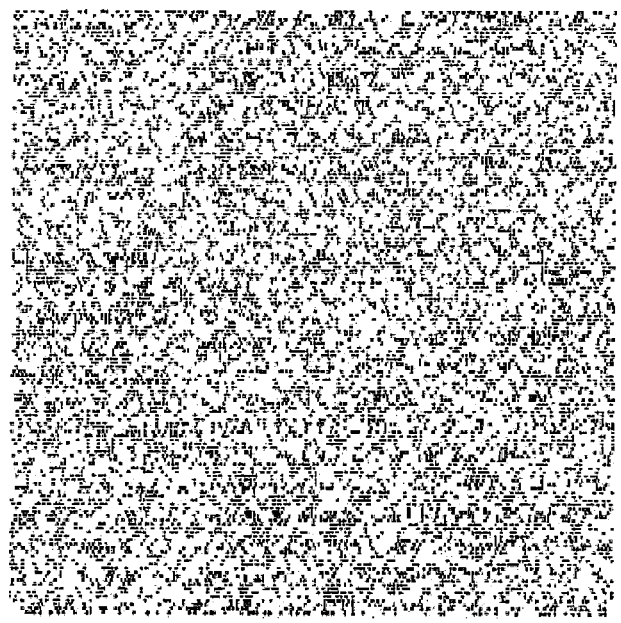
Figure 6A:
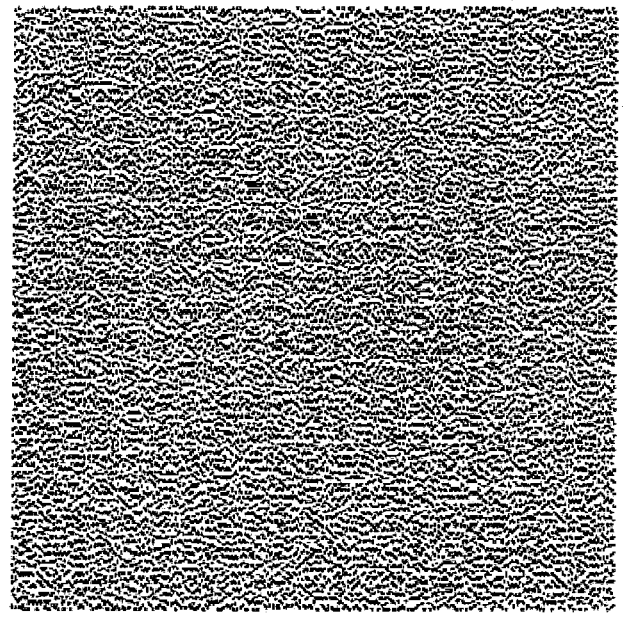
FIGS. 6a and 6b show a representation of a sampled screening cell according to an example of the present disclosure.
Figure 6B:
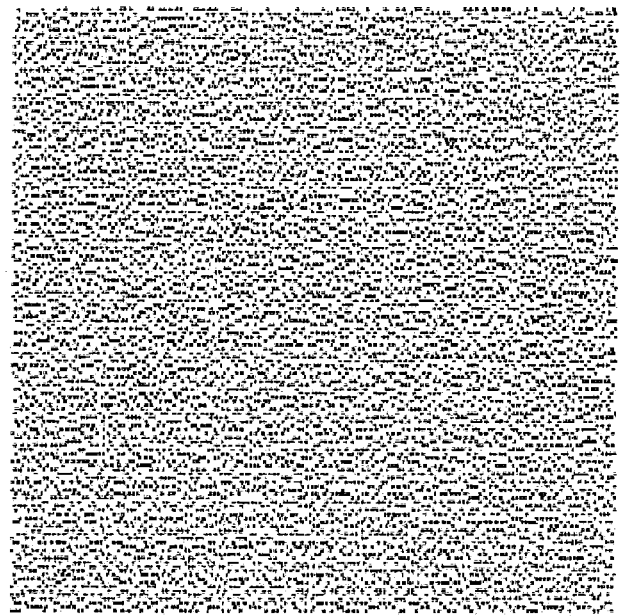

Referring now to FIGS. 5A and 5B, FIG. 5A shows a schematic representation of a bit map image screened according to known prior art screening processes. FIG. 5B is a schematic representation of the bit map image of FIG. 5A having every other row removed from the image. The resulting image has numerous problems with non-smooth portions and patterns. Referring now to FIGS. 6A and 6B, FIG. 6A shows a schematic representation of a bit map image of two interlaced screens made using the methods of the present disclosure. The bit map image is not quite as smooth as the bit map image of FIG. 5A. However, FIG. 6B is a schematic representation of the bit map image of FIG. 6A having every other row removed from the image. The resulting image is much smoother than the image of FIG. 5B. In fact, the image of FIG. 6B in this example is one of the two screens that are effectively integrated into the single screening cell. This is due to the use of the print mode information of the printer in creating the screening cell that is used with the RIP to create the bit map image of the present disclosure. The bit map image of FIG. 6B is more tolerant of the types of errors in printing that are common to printing, and so the resultant images are more smooth and print with better overall quality when common errors occur in printing.

Figure 7A:
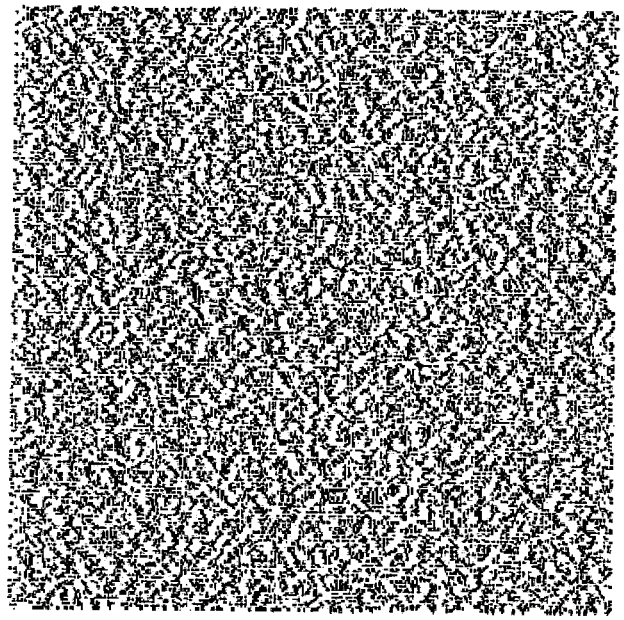
FIG. 7a is a representation of sample bit maps according to prior art.
Figure 7B:
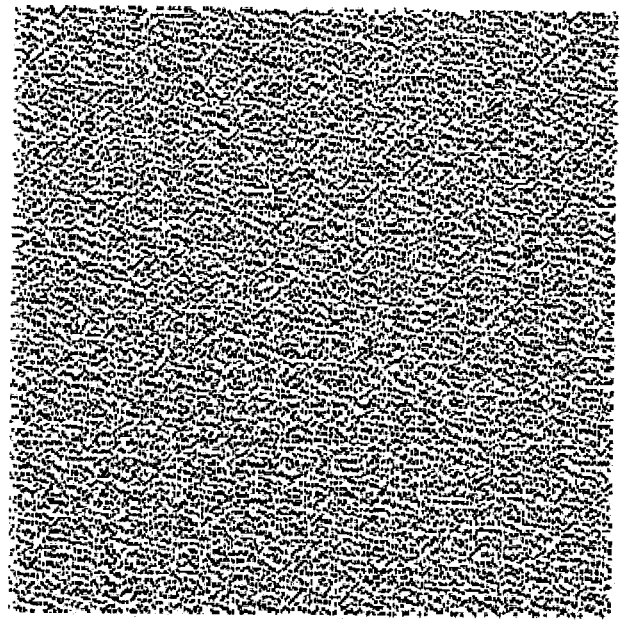
FIG. 7b is a representation of sample bit maps according to an example of the present disclosure.

FIGS. 7A and 7B show sample bit map images printed with a four pixel error introduced in every other row of the image, simulating calibration and tuning errors in the printing process. FIG. 7A is the resultant image when the screen of FIG. 5A is given the error. Patterns and problems are clearly present in the image. FIG. 7B is the resultant image when the screen of FIG. 6A is given the error. The resultant image looks much closer to the original image.

In another example, the bit map images of the present disclosure could be further improved by using known processes to improve cells based on certain criteria. Those various processes are amenable to use with the examples described herein to further improve the cell quality without departing from the scope of the disclosure.

Although specific embodiments have been illustrated and described herein it is manifestly intended that the scope of the claimed subject matter be limited only by the following claims and equivalents thereof.

What is claimed is:

1. A method of generating a printable image from a base image, comprising:
    identifying parameters of a multi-pass printer on which the printable image is to be printed using a plurality of passes of the multi-pass printer;
    generating a screening cell using the identified parameters of the multi-pass printer to merge a plurality of sub-cells; and
    generating a bit map image from the screening cell and the base image;
    wherein each sub-cell of the plurality of sub-cells contains data for a mutually exclusive set of passes of the plurality of passes.

2. The method of claim 1, and further comprising:
    printing the bit map image without changing the identified parameters of the multi-pass printer.

3. The method of claim 1, wherein identifying parameters comprises:
    reading print mode information from the multi-pass printer.

4. The method of claim 1, wherein generating a screening cell further comprises interlacing the plurality of sub-cells according to the identified parameters of the multi-pass printer to form the screening cell.

5. The method of claim 4, wherein interlacing the plurality of sub-cells according to the identified parameters of the multi-pass printer generates the screening cell that combines the identified parameters of the multi-pass printer with the plurality of sub-cells to conform the screening cell to the identified parameters of the multi-pass printer.

6. The method of claim 1, wherein the identified parameters of the multi-pass printer include print mode information specific to a selected print mode of the multi-pass printer.

7. A method of printing a representation of a base image, comprising:
    reading print information parameters from a multi-pass printer;
    generating a plurality of sub-cells, wherein data for each pass of the multi-pass printer is stored in a corresponding sub-cell of the plurality of sub-cells, and wherein data for adjacent passes of the multi-pass printer are stored in one or more sub-cells of the plurality of sub-cells other than the corresponding sub-cell of a pass of the multi-pass printer to which they are adjacent;
    generating a screening cell using the print information parameters to merge the plurality of sub-cells;
    generating a bit map image complying with the print information parameters from the screening cell and the base image; and
    printing the bit map image on the multi-pass printer without changing a print mode of the multi-pass printer.

8. The method of claim 7, wherein generating a screening cell and generating a bit map image further comprises:
    generating the plurality of sub-cells as a plurality of half-toning sub-cells;
    interlacing the plurality of half-toning sub-cells into the screening cell to conform to the print information parameters; and
    screening the base image with the screening cell.

9. The method of claim 8, wherein screening the base image with the screening cell is performed with a raster image processor.

10. The method of claim 7, and further comprising:
    printing the bit map image according to the print information parameters.

11. The method of claim 10, wherein printing is done in the print mode determined by the print information parameters reading.

12. A system for generating a printable image from a base image, comprising:
    a sub-cell generator, wherein individual sub-cells generated by the sub-cell generator represent data for only a portion of the printable image;
    a print mode information storage;
    a merger to merge generated sub-cells using print mode information stored in the print mode information storage to generate a single screening cell, wherein a portion of each sub-cell of the generated sub-cells is between portions of each other sub-cell of the generated sub-cells in the single screening cell; and a raster image processor to process the base image with the single screening cell.

13. The system of claim 12, wherein the merger is adapted to interlace the generated sub-cells into the single screening cell according to the print mode information stored in the print mode information storage.

* * * * *